(12) United States Patent
Markovitz et al.

(10) Patent No.: US 9,667,592 B2
(45) Date of Patent: May 30, 2017

(54) EFFICIENT UTILIZATION OF INTERNET PROTOCOL ADDRESSES

(71) Applicant: Gilat Satellite Networks Ltd., Petah Tikva (IL)

(72) Inventors: Oren Markovitz, Raanana (IL); Eldad Yitzhaki, Tel-Mond (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 221 days.

(21) Appl. No.: 14/595,029

(22) Filed: Jan. 12, 2015

(65) Prior Publication Data

US 2015/0200909 A1 Jul. 16, 2015

Related U.S. Application Data

(60) Provisional application No. 61/927,545, filed on Jan. 15, 2014.

(51) Int. Cl.
*G06F 15/173* (2006.01)
*H04L 29/12* (2006.01)
*H04L 12/741* (2013.01)

(52) U.S. Cl.
CPC ........ *H04L 61/2015* (2013.01); *H04L 45/745* (2013.01); *H04L 61/103* (2013.01); *H04L 61/6013* (2013.01); *H04L 61/6068* (2013.01)

(58) Field of Classification Search
CPC .............. H04L 61/6068; H04L 61/103; H04L 61/2015; H04L 61/2092; H04L 45/745
USPC ........................................ 709/203, 223, 245
See application file for complete search history.

(56) References Cited

U.S. PATENT DOCUMENTS

| | | | |
|---|---|---|---|
| 6,769,000 B1 * | 7/2004 | Akhtar | H04L 29/06 |
| 2006/0002324 A1 * | 1/2006 | Babbar | H04L 29/1232 370/325 |
| 2007/0299942 A1 * | 12/2007 | Lu | H04L 29/12028 709/220 |
| 2009/0210518 A1 * | 8/2009 | Verma | H04L 29/12028 709/220 |

* cited by examiner

*Primary Examiner* — Frantz Jean
(74) *Attorney, Agent, or Firm* — Banner & Witcoff, Ltd.

(57) ABSTRACT

In accordance with embodiments of the disclosure, a communication network comprising a hub and a plurality of terminals may be provided. In some embodiments, the hub and the terminals may communicate over a wireless medium. A method is presented for allocating IP addresses (e.g., public IP addresses) in the network while achieving very high utilization of IP addresses and maintaining IP connectivity between nodes connected to the terminals and between said nodes and a network connected to the communication network via the hub (e.g., a public network, such as the Internet). In some embodiments, a common IP address (e.g., a public IP address) may be allocated to each of the terminals for their local interfaces, and routing techniques may be used to resolve resulting obstacles.

20 Claims, 6 Drawing Sheets

| CIDR Notation | Subnet Mask | IP Addresses in Subnet |
| --- | --- | --- |
| /27 | 255.255.255.224 | 32 |
| /28 | 255.255.255.240 | 16 |
| /29 | 255.255.255.248 | 8 |
| /30 | 255.255.255.252 | 4 |
| /31 | 255.255.255.254 | 2 |
| /32 | 255.255.255.255 | 1 |

EFFICIENT UTILIZATION OF INTERNET PROTOCOL ADDRESSES

PRIORITY CLAIM

This application claims priority to U.S. Provisional Patent Application Ser. No. 61/927,545, filed Jan. 15, 2014, and entitled "A Network and a Routing Method Thereof," the disclosure of which is incorporated by reference herein in its entirety and made part hereof.

FIELD

Aspects of the disclosure pertain to the field of communication networks in general and to communication networks utilizing the Internet Protocol in particular.

BACKGROUND

Internet Protocol version 4 (IPv4) utilizes a 32-bit representation for network addresses (e.g., IP addresses), thus allowing about 4 billion hosts to be connected in a single network. As big as this number may be, it is still a finite number. While depletion of the IP public addresses pool has been foreseen since the late 1980s (as the Internet started to grow at an accelerating rate), the shortage in available public IP addresses has reached critical levels during the last few years.

Over the years, several methods have been developed and adopted in order to postpone the complete exhaustion of the public IP addresses pool and to allow more hosts to be connected to the Internet using the finite range of public IP addresses. Of those methods, perhaps the most known and widely accepted were Network Address Translation (NAT) and Classless Inter-Domain Routing (CIDR).

A private network is a network that, by design, cannot be accessed from the Internet. A private network can contain many hosts. NAT allows a private network to be connected to a public network, such as the Internet, using one or more (typically, relatively few compared to the number of private IP addresses used in the private network) public IP addresses by means of translating between the public IP address(es) and the private IP addresses used in the private network. Using NAT, organizations, small offices, and even residential users do not need to get publicly routable IP addresses from their respective Internet Service Providers (ISPs) for each host or network device in their networks. Instead, an ISP can allocate a single IP address for each such network and preserve its pool of public IP addresses for servicing more customers.

While use of NAT has unquestionably postponed the exhaustion of public IP addresses, it came at a price. The model of NAT is fundamentally one of asymmetric data access, i.e., accessing the Internet from the private network but not the other way around. This asymmetric data access model interferes with one of the fundamental principles of the Internet (i.e., the end-to-end principal), and this failure to adhere to the Internet architecture results in problems at the application level. For example, applications that depend on IP addresses, such as File Transfer Protocol (FTP), Voice over Internet Protocol (VoIP), and Internet Protocol Security (IPsec), often fail when NAT is used. Though it is possible to use application-layer gateways (ALG) to repair the damage done by NAT and to allow such applications to operate even when NAT is used, use of these ALGs makes it more difficult to deploy new Internet applications (e.g., the ALGs may have to be upgraded or replaced).

The second method previously mentioned, as one which helped in postponing the complete exhaustion of the public IP addresses pool, is Classless Inter-Domain Routing (CIDR), which is a method for allocating IP addresses and routing IP packets. The Internet Engineering Task Force (IETF) introduced CIDR in 1993 to replace the previously used addressing architecture in the Internet, which was based on classes. CIDR is based on variable-length subnet masking (VLSM), thus allowing a network to be divided into differently sized subnets. In practice, CIDR determines the network size, i.e., the number of IP addresses available for use in the network. FIG. 4 shows a table 400 with several subnet masks and their corresponding network sizes. The notation "/N" defines the number (N) of leftmost bits in the subnet mask which are set to "1" while all the remaining bits, which correspond to the "host bits", are set to "0."

In practice, the "host all zeros" address is reserved for referring to the entire subnet and the "host all ones" address is used as a broadcast address in the given subnet. Thus the maximum number of hosts in each subnet equals the number of IP addresses in the subnet less 2. Consequently /31 networks (i.e., subnets) are rarely used, as the only possible addresses on a /31 network are the "host all ones" and the "host all zeros" addresses. For the same reasons, the smallest network which behaves "as expected," i.e., as a larger network, is a /30 network. Out of 4 IP addresses in a /30 network, only 2 addresses are usable for hosts and thus a /30 network is usable only as a point-to-point link (or "Glue Network").

A /30 network, however, is a wasteful network in terms of IP addresses utilization. For example, for connecting a host to the Internet via a router but without using NAT, the smallest network that can be used between the host and the router is a /30 network. The hosts gets a public IP address, but 3 additional public IP addresses are wasted, i.e., the network address ("host all zeros"), the broadcast address ("host all ones") and the host address the router is using. This brings the efficiency of network addresses utilization to only 25%. FIG. 1 shows network 100, which is a /16 network utilizing the IP address range of 20.20.x.x/16 (i.e., a total of 65,536 addresses). Even if the owner of network 100 wants to allocate only one IP address to each user, using a /30 subnet per user results in allocating 4 IP addresses per user and thus servicing only 16,384 users instead of 65,536 users.

One method for resolving the wastefulness of /30 networks and to enable use of all IP addresses as host addresses (i.e., to achieve 100% efficiency) is to use /32 networks and allocate a /32 mask for each host. FIG. 2 shows network 200, which is a /16 network utilizing the IP address range of 20.20.x.x/16 (i.e., a total of 65,536 addresses). Unlike network 100, however, network 200 uses a /32 subnet per user. Thus, each user is allocated a single IP address and the network can service 65,536 users. Configuring a host with a /32 mask, however, results in the host being all alone in its own network, i.e., it cannot communicate using IP with the router on the other side of the link. Therefore, network 200 uses the Point-to-Point Protocol (PPP), a data link (layer 2) protocol commonly used for establishing direct connectivity between two networking nodes.

FIG. 3 shows wireless IP communication network 300. Network 300 is composed of hub 310 (e.g., a border router) and customer premises equipment (CPE) terminals (or routers) 320a-n that communicate over a wireless medium. As an IP network, every entity in network 300 utilizes a dedicated IP address. As network 300 is connected to an external network (e.g., via hub 310), such as the Internet, network 300 has to be assigned public IP addresses in order to enable end-to-end IP connectivity between nodes connected to network 300 and nodes outside network 300. As hub 310 and CPE terminals 320*a-n* are each an independent router, in case each CPE terminal 320*a-n* supports a single host 330*a-n* respectively, /30 subnets are used and network 300 utilizes public IP addresses at 25% efficiency.

Assuming that use of NAT and PPP (or any other encapsulation or tunneling method) is not desired, another method is required for improving IP addresses utilization efficiency while maintaining end-to-end IP connectivity in a network similar to network 300.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some aspects of the disclosure in a simplified form as a prelude to the description below.

An IP communication network may comprise a hub (e.g., a router) and a plurality of customer premises equipment (CPE) terminals (e.g., routers). In some embodiments, the IP communication network may be a wireless network, wherein the hub and the CPE terminals may be communicating over a wireless medium. In some embodiments, such a wireless network may be a satellite communication network.

Aspects of the disclosure are directed to a method for allocating a single IP address to a subnet associated with a CPE terminal of the communication network while maintaining IP connectivity between a node that may be connected to the CPE terminal and a network that may be connected to the communication network at the hub of the communication network.

BRIEF DESCRIPTION OF THE DRAWINGS

Figure 1:
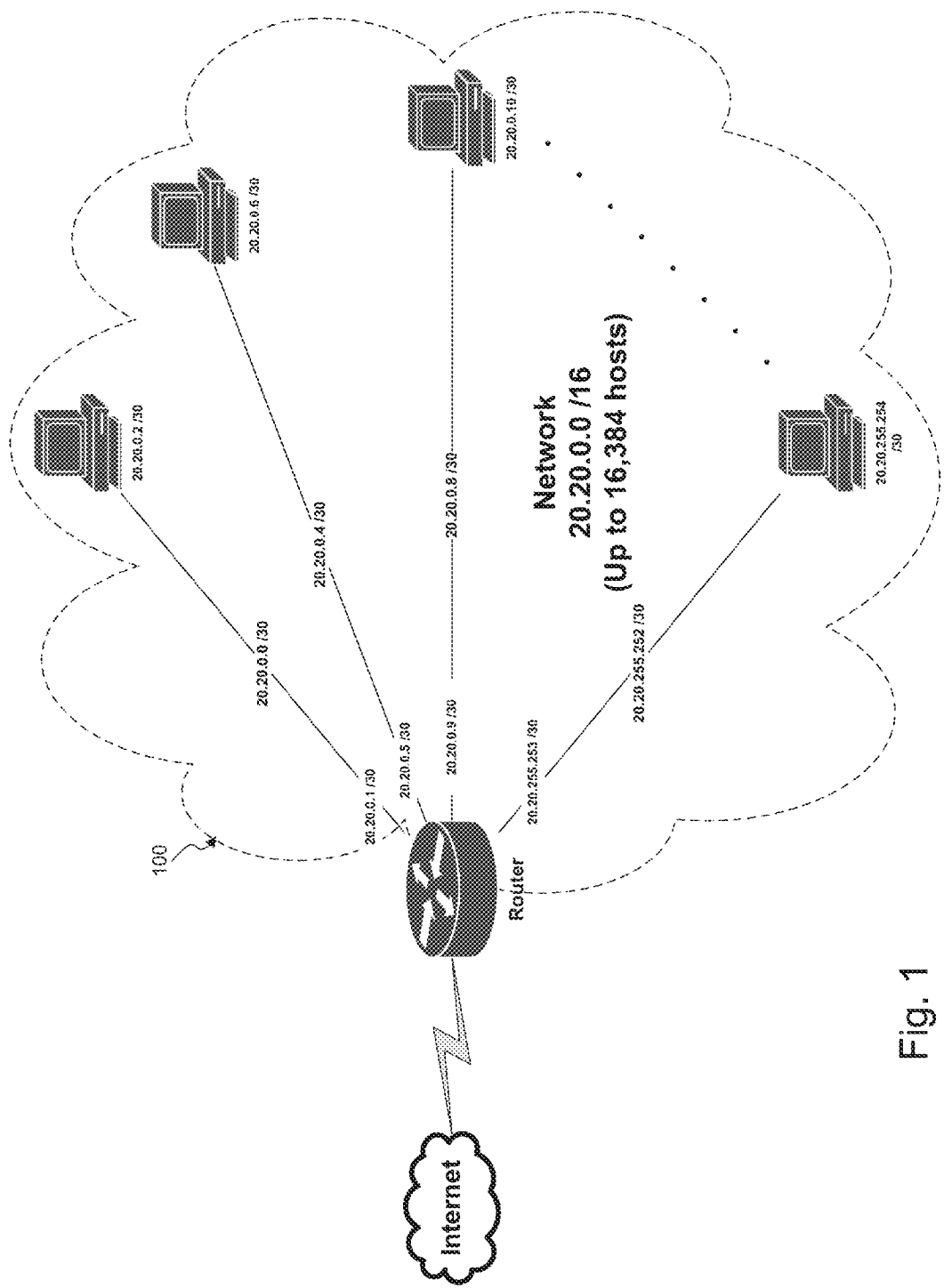
Figure 2:
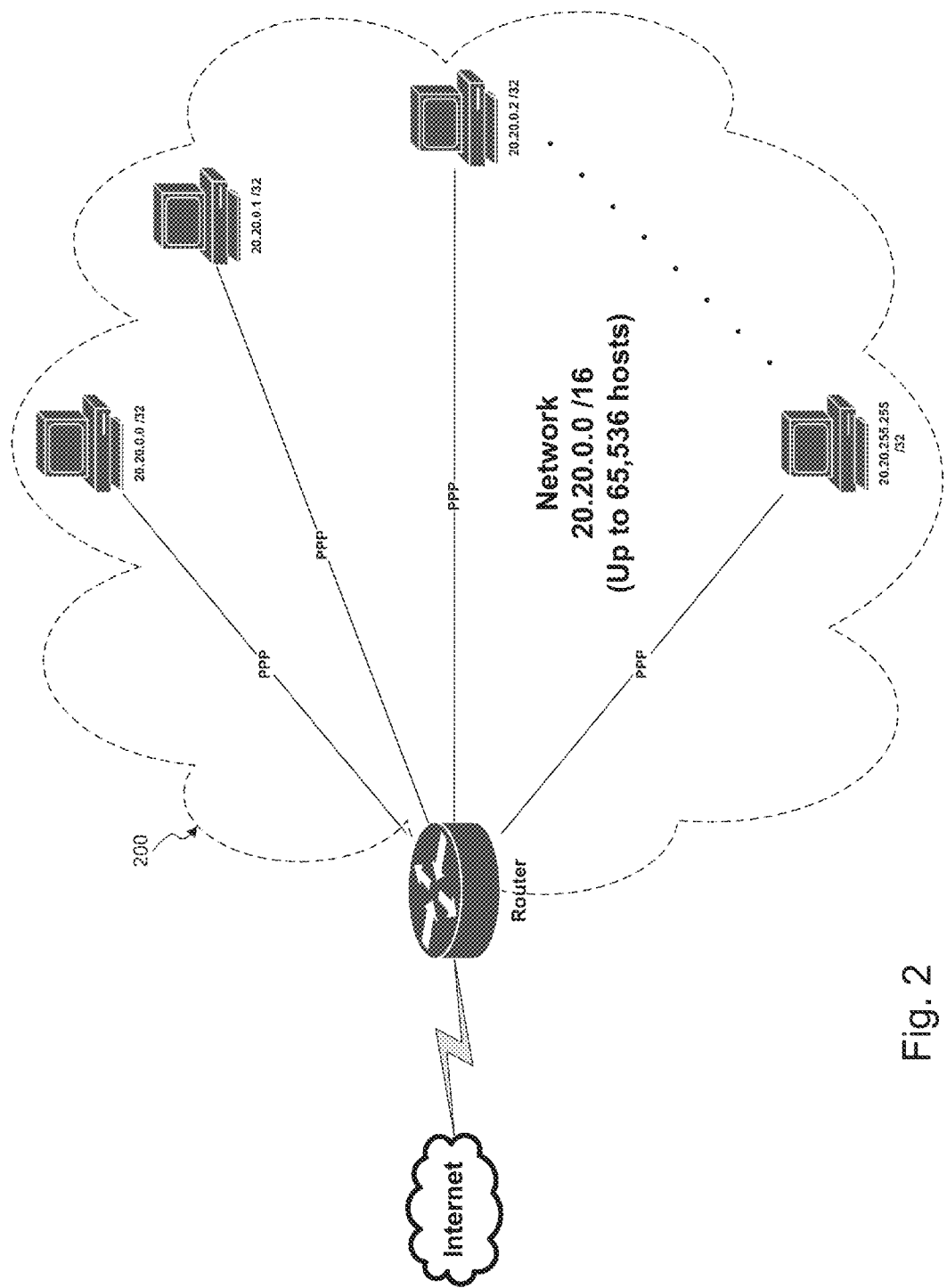
Figure 3:
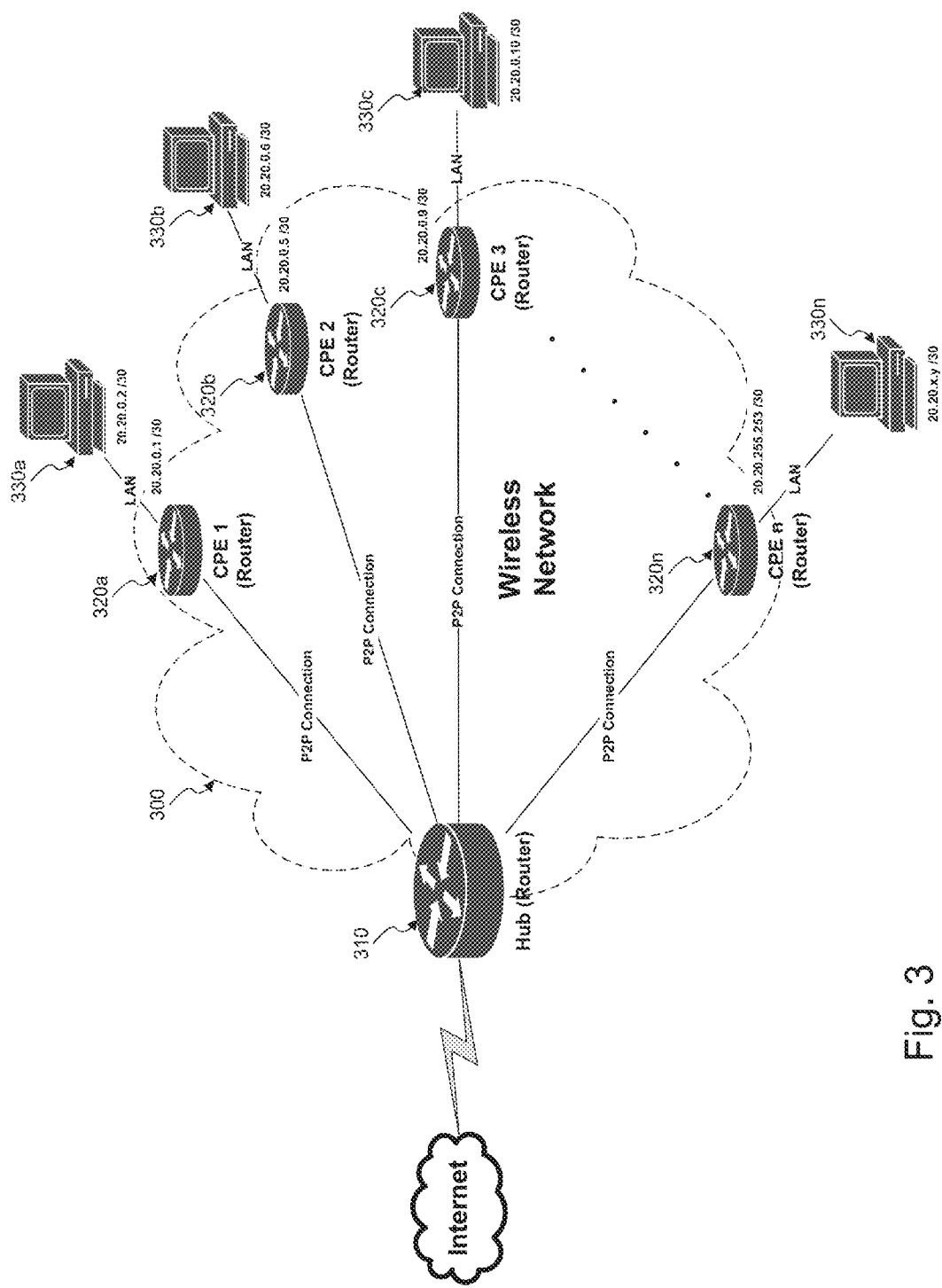
Figure 5:
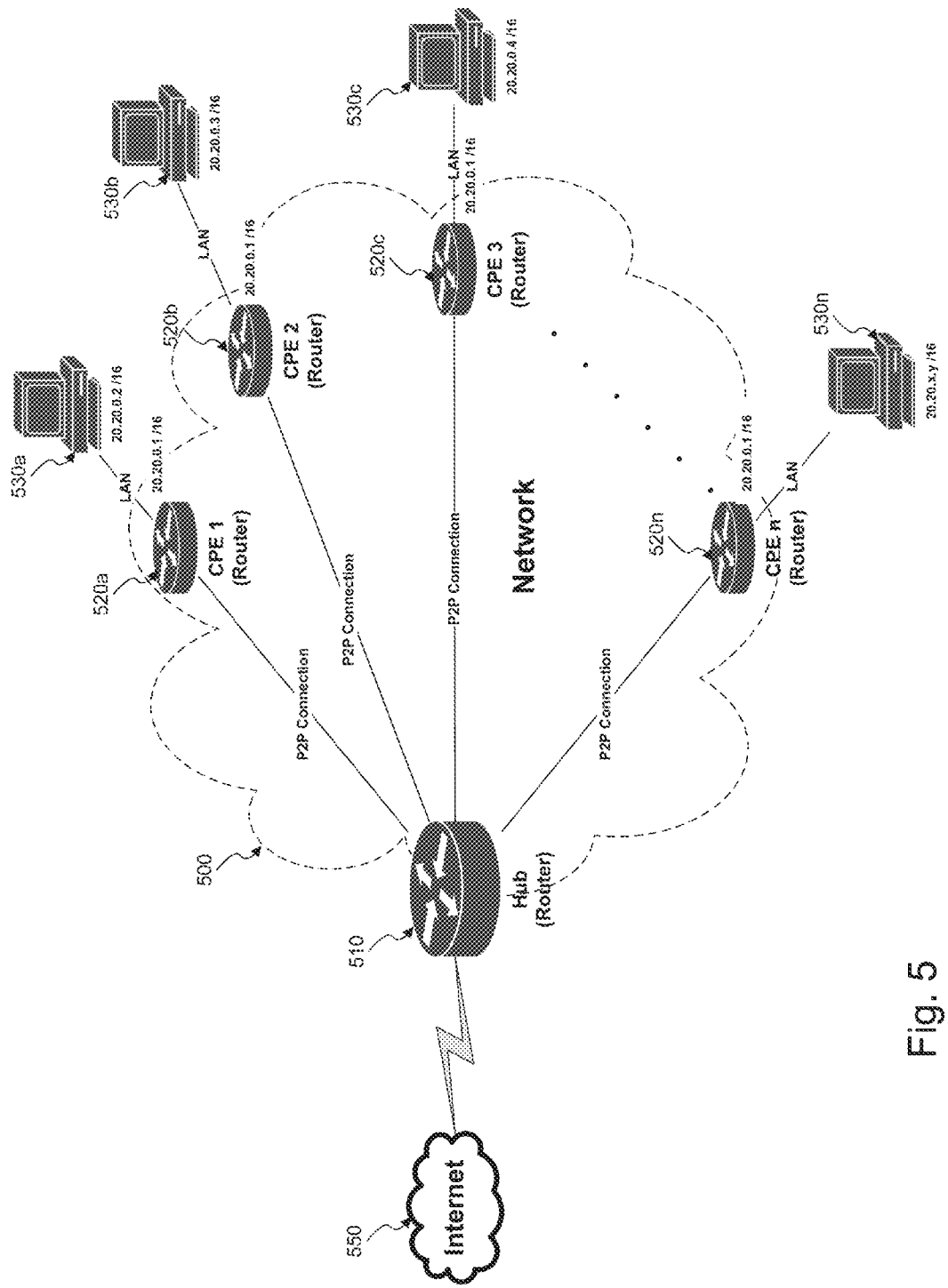
Figure 6:
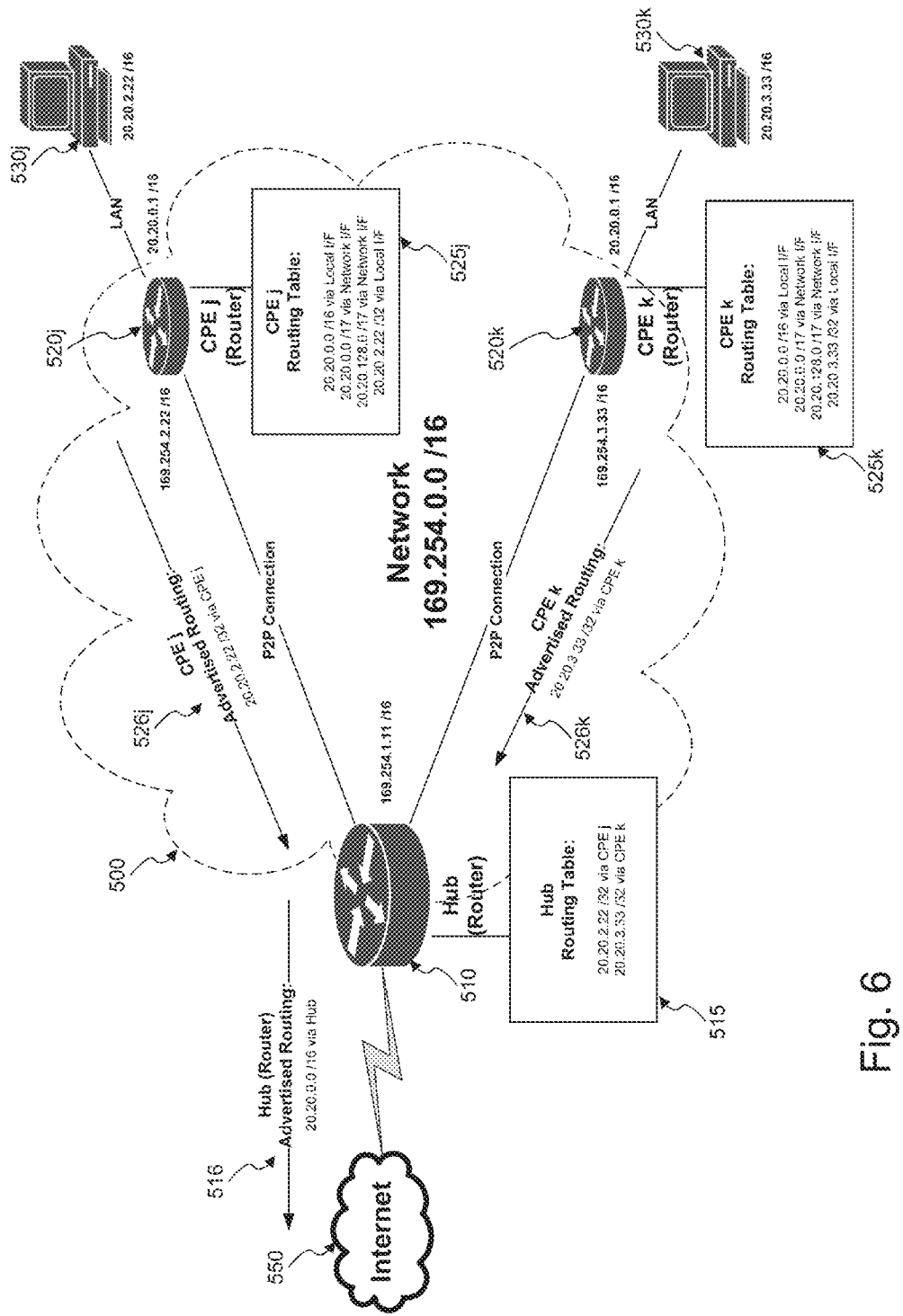

Having thus described the disclosure in general terms, reference will now be made to the accompanying drawings, which are not necessarily drawn to scale, and wherein:

FIG. 1 shows a /16 network in accordance with commonly known prior art;

FIG. 2 shows a /30 network in accordance with commonly known prior art;

FIG. 3 shows a wireless communication system in accordance with commonly known prior art;

FIG. 4 shows a table describing CIDR subnets in accordance with commonly known prior art;

FIG. 5 shows an example of a communication system in accordance with aspects of the disclosure; and FIG. 6 shows an example of communication system and illustrative routing table instances in accordance with aspects of the disclosure.

DETAILED DESCRIPTION

Referring to FIG. 5, communication network 500 may comprise a hub 510 and a plurality of customer premises equipment (CPE) terminals 520*a-n* (terminals). In some embodiments, at least one terminal of terminals 520*a-n* and/or hub 510 may be configured to operate as Internet Protocol routers. At least one terminal of terminals 520*a-n* may be configured to have at least one network interface and one local interface. Hub 510 may be configured to have at least one network interface and at least one local interface. In some embodiments, network 500 may be a wireless communication network and the network interfaces of the at least one terminal of terminals 520*a-n* and of hub 510 may include radio interfaces.

Using their respective network interfaces, hub 510 may be configured to communicate with terminals 520*a-n* and terminals 520*a-n* may be configured to communicate with hub 510 (e.g., over a wireless medium) using the Internet Protocol (IP). In some embodiments, using their respective network interfaces, any two or more terminals out of terminals 520*a-n* may be configured to directly communicate with one another (e.g., over the wireless medium), using IP, without routing the communicated data (e.g., that may be carried within IP packets) via hub 510. Furthermore, at least one of terminals 520*a-n* may be configured to connect to one or more local networks using its at least one local interface. Each such local network may contain at least one node (host), such as nodes 530*a-n*. In addition, hub 510 may be configured to connect using its local interface to an external public IP network 550 (e.g., the Internet). Thus, hub 510 and terminals 520*a-n* may be configured to support end-to-end IP connectivity between nodes 530*a-n* and public IP network 550 that may be connected to hub 510.

In accordance with aspects of the disclosure, a method is presented for allocating IP addresses in network 500, while maintaining IP connectivity between any of nodes 530*a-n* that may be connected to a corresponding terminal 520*a-n* and network 550 that may be connected to network 500 at hub 510. Said method may allow high utilization of IP addresses in network 500, as well as maintaining IP connectivity over the communication medium (e.g., a wireless communication medium), in the local networks of terminals 520*a-n* and between hub 510 and network 550. While the following description may be based on the example in FIG. 5, according to which network 500 may be a /16 network (e.g., supporting up to 65,536 IP addresses), it shall be appreciated by those skilled in the art that network 500 may be of any size without departing from the following description.

In accordance with aspects of the disclosure, each of terminals 520*a-n* may be allocated the same IP address (e.g., a public IP address) and the same subnet for their respective local interfaces (e.g., interfaces connected to their respective local networks), wherein the subnet mask may match the size of network 500 (e.g., /16 in FIG. 5). In addition, each of terminals 520*a-n* may be allocated one, perhaps unique, additional IP address (e.g., an additional public IP address) within said allocated subnet. The additional IP address may be further allocated (e.g., using Dynamic Host Configuration Protocol (DHCP)) to a node that may be connected to the terminal (e.g., via its local interface), such as nodes 530*a-n*. In some embodiments, the subnet mask for said additional IP address may be set in accordance with the size of network 500 or of a sub-network of network 500. For example, as per the example shown in FIG. 5, each of terminals 520*a-n* may be allocated the IP address 20.20.0.1 (e.g., the public IP address) and utilize the /16 subnet mask, terminal 520*a* may be allocated the IP address 20.20.0.2 for node 530*a* (e.g., an additional public IP address), terminal 520*b* may be allocated the IP address 20.20.0.3 for node 530*b* (e.g., an additional public IP address), and so on, each with a /16 subnet as well. It may be noted that each terminal of terminals 520*a-n* may be configured, upon being allocated the common IP address (e.g. 20.20.0.1/16) for its local interface, to add a corresponding routing rule to its routing table (e.g., a routing rule for a network 20.20.0.0/16 as per the example in FIG. 5).

In some embodiments (not shown in FIG. 5), any of the terminals 520a-n may be configured to connect to more than one node (e.g., using at least one local interface of each terminal). In such embodiments, a terminal connected to a plurality of nodes, in addition to being allocated the common IP address as previously described, may be allocated a plurality of additional (perhaps unique and/or public) IP addresses within the allocated subnet associated with the common IP address, wherein the number of the additional IP addresses allocated may correspond to the number of nodes connected to the terminal. The terminal may be further configured to allocate the additional IP addresses (e.g., using Dynamic Host Configuration Protocol (DHCP)) to the nodes that may be connected to the terminal. In some embodiments, the subnet masks for said additional IP addresses may be set in accordance with the size of network 500 or of a sub-network of network 500.

The allocation method described above may allow for very high utilization of IP addresses. Only three IP addresses may be consumed by network 500 and might not be available for allocation to nodes 530a-n (e.g., as per the example of FIG. 5, the common IP address allocated to terminals 520a-n (e.g., 20.20.0.1), the network address (e.g., "host all zeros," 20.20.0.0) and the broadcast address (e.g., "host all ones," 20.20.255.255). All other addresses (e.g., 65533 addresses in the case of a /16 network as shown in FIG. 5) may be usable as addresses for nodes 530a-n. Thus, network 500 may utilize its IP addresses pool at nearly 100% efficiency (e.g., 99.995% in the case of a /16 network).

At least for the purpose of maintaining IP connectivity between nodes 530a-n and public network 550 (e.g., the Internet), as well as between nodes 530a-n themselves, however, terminals 520a-n may be configured to set (or tweak) their routing mechanisms in accordance with the following characteristics:
- a) Each terminal of terminals 520a-n may be configured to advertise the additional IP address allocated to it (e.g., additional unique and/or public IP address) corresponding to a node of nodes 530a-n that may be connected to the terminal, using a /32 subnet. In some embodiments, said advertising may be in accordance with one or more applicable routing protocols (e.g., the Routing Information Protocol (RIP)). In some embodiments, wherein the terminal may be allocated a plurality of additional IP addresses (e.g., additional unique and/or public IP addresses) corresponding to a plurality of nodes that may be connected to the terminal, the terminal may be configured to advertise each of these additional IP address using a /32 subnet.
- b) Regardless of any one or more routing protocols that may be used by any terminal 520a-n, each terminal of terminals 520a-n may be configured not to advertise its own IP address (e.g., the common IP address), for at least the purpose of preventing hub 510 from learning multiple (i.e., duplicate) routes to the common IP address which may be allocated to each of terminals 520a-n, as previously described.
- c) Each terminal of terminals 520a-n may be configured as an Address Resolution Protocol (ARP) proxy, for at least the purpose of providing proxy ARP replies.
- d) Each terminal of terminals 520a-n may be configured to include in its routing table a routing rule to the corresponding node 530a-n, which may be connected to its local network, and two or more routing rules corresponding to sub-networks of network 500. In some embodiments, said two or more sub-networks may not overlap one another in whole or in part and may together span (i.e., completely overlap) network 500 in its entirety.

Referring to FIG. 6, a section of communication network 500 may comprise hub 510 and two of CPE terminals 520a-n (e.g., terminal 520j and terminal 520k). Nodes 530j and 530k may be connected to terminals 520j and 520k, respectively (e.g., via their respective local interfaces), and public network 550 may be connected to network 500 via hub 510 (e.g., via its local interface). FIG. 6 shows examples of routing tables 515, 525j, and 525k and examples of route advertisements 516, 526j, and 526k that may be associated with hub 510, terminal 520j, and terminal 520k, respectively. As previously described, allocating each terminal of terminals 520a-n with a common IP address (e.g., 20.20.0.1/16) for its local interface may result in a routing rule for a corresponding network (e.g., 20.20.0.0/16) to be added to the routing table of each such terminal, as shown in routing tables 525j and 525k.

Terminals 520j and 520k may be configured in accordance with previously described characteristics a) and b) for at least the purpose of allowing (or facilitating) well-known routes to nodes 530j (e.g., 20.20.2.22) and 530k (20.20.3.33), respectively, while avoiding multiple (i.e., duplicated) routes for the common IP address (e.g., 20.20.0.1). Thus, as per the example in FIG. 6, terminal 520j may advertise the subnet 20.20.2.22/32 (526j) and terminal 520k may advertise the subnet 20.20.3.33/32 (526k), for example, towards hub 510. Consequently, hub 510 may have in its routing table 515 rules for routing IP packets to nodes 530j (e.g., 20.20.2.22) and 530k (e.g., 20.20.3.33) via terminals 520j and 520k, respectively. In some embodiments, wherein a terminal may be connected to a plurality of nodes, the terminal may be configured to advertise (e.g., towards the hub) a /32 subnet for each host connected to the terminal. Consequently, hub 510 may have in its routing table rules for routing IP packets to a plurality of nodes via the same terminal (not shown in FIG. 6).

It may be noted that terminals 520j and 520k, being configured as previously described, may not use their respectively assigned IP addresses (e.g., their respective public IP addresses) for supporting IP connectivity to themselves over their respective network interfaces (e.g., wireless network interfaces) with hub 510. For at least the purpose of supporting such IP connectivity to the terminals themselves, hub 510 and terminals 520a-n (e.g., 520j and 520k) may be configured to use private IP addresses. For example, as per FIG. 6, network 500 may use IP addresses of subnet 169.254.0.0/16 for internal IP connectivity between terminals 520a-n and hub 510 (e.g., over the wireless network interfaces).

Furthermore, terminals 520j and 520k may be configured in accordance with previously described characteristics c) and d) for at least the purpose of allowing IP connectivity between any two nodes connected to different terminals, such as nodes 530j and 530k which may be connected to terminals 520j and 520k, respectively.

For example, node 530j (e.g., 20.20.2.22) may need to send a data packet to node 530k (e.g., 20.20.3.33). As node 530j may be configured with a subnet mask matching the entire network (e.g., a /16 subnet mask), node 530j may determine that node 530k (e.g., 20.20.2.33) may be in its local network (e.g., 20.20.0.0/16) and thus node 530j may send an ARP request over the local network connected to terminal 520j in order to resolve the MAC (Media Access Control) address of node 530*k*. Since node 530*k* may not be connected to the local network of terminal 520*j* (e.g., since it may be connected on the local network of terminal 520*k*), however, the ARP request might not be answered (e.g., since terminal 520*j* may behave as a router and not forward ARP requests from one interface to another). If the ARP request remains unanswered, node 530*j* may never send the data packet to node 530*k*. To overcome this obstacle, each terminal of terminals 520*a*-*n* (e.g., terminal 520*j*) may be configured as an ARP proxy and provide its own MAC address in response to an ARP request specifying an IP address in the network subnet, except perhaps for an ARP request directed at its one or more corresponding nodes (e.g., node 530*j*).

Once an ARP reply arrives at node 530*j* and node 530*j* sends a packet to node 530*k* (e.g., for at least the purpose of allowing terminal 520*j* to route the packet to the terminal's network interface), terminal 520*j* may need to associate network 500 with the network interface. For example, as per the example of FIG. 6, network 20.20.0.0/16 may need to be associated with the network interface of terminal 520*j*. This may not be possible, however, since terminal 520*j* may associate the same subnet (e.g., 20.20.0.0/16) with its local interface, as previously described, and since the terminal may behave as a router and may not be able to associate the same subnet with two different interfaces. Thus, since IP routing may be based on a best match principle (e.g., selecting the rule representing the smallest sub-network that contains the IP address of interest), each terminal of terminals 520*a*-*n* (e.g., terminal 520*j*) may be configured, for example upon being allocated the common IP address and its corresponding subnet, to include in its routing table two or more routing rules corresponding to sub-networks of network 500 (i.e., true sub-networks of network 500) and associate them with its network interface. In some embodiments, said two or more sub-networks may not overlap one another in whole or in part and may together span (i.e., completely overlap) network 500 in its entirety. For example, as per the example of FIG. 6, terminal 520*j* may be configured to add routing rules for sub-networks 20.20.0.0/17 and 20.20.128.0/17 to its routing table, wherein the two sub-networks may not overlap one another and may together span the entire network 20.20.0.0/16.

In accordance with aspects of the disclosure, a satellite communication system may comprise a hub and a plurality of terminals. At least one terminal of said plurality of terminals may be configured to have at least one network interface and one local interface. In addition, the hub may be configured to have at least one network interface and at least one local interface. The hub may be configured to communicate with the terminals via a satellite, and the terminals may be configured to communicate with the hub via the satellite (e.g., using their respective network interfaces), wherein one or more aspects of communication between the hub and the terminals (e.g., routing of packets) may be in accordance with the Internet Protocol (IP). In some embodiments, two or more terminals may be configured to directly communicate with one another via the satellite without routing the communicated data via the hub. Furthermore, one or more of the terminals may be configured to connect to one or more local IP networks (e.g., via at least one local interface), wherein each local network may contain at least one node (e.g., host). In addition, the hub may be configured to connect (e.g., via a local interface) to an external IP network (e.g. a public network, such as the Internet). Thus, the hub and the terminals may be configured to support end-to-end IP connectivity between nodes connected to the terminals and a public IP network that may be connected to the hub.

In some embodiments, the hub may be configured to allocate the same IP address (e.g., a single public IP address) and the same subnet to each of the terminals (e.g., for their respective local interfaces, which may be connected to their respective local networks), wherein the subnet mask may correspond to the size of the satellite system (i.e., the network), for example, in terms of nodes. In addition, the hub may be configured to allocate one, perhaps unique, additional IP address (e.g., an additional public IP address) within said allocated subnet to each terminal, for at least the purpose of allowing the terminal to further allocate this additional IP address (e.g., using Dynamic Host Configuration Protocol (DHCP)) to a node that may be connected to the terminal. In some embodiments, the subnet mask for said additional IP address, which may correspond to a node that may be connected to the terminal, may be set in accordance with the size of the satellite network or a sub-network supported by the satellite communication system.

In some embodiments, each terminal in the satellite communication system may be configured to:
a) Advertise the additional IP address allocated to it (e.g., additional unique and/or public IP address) corresponding to a node that may be connected to the terminal, using a /32 subnet, for example, using one or more applicable routing protocols (e.g., the Routing Information Protocol (RIP));
b) Not advertise its own IP address (e.g., the common IP address), regardless of any one or more routing protocols that it may be configured to use;
c) Serve as an Address Resolution Protocol (ARP) proxy for at least the purpose of providing proxy ARP replies; and
d) Add to its routing table a routing rule corresponding to the IP address that may be assigned to it for its local interface (e.g., the common IP address), a routing rule corresponding to a node that may be connected to its local network, and two or more routing rules (e.g., associated with its network interface) corresponding to sub-networks of the satellite communication system's network. In some embodiments, said two or more sub-networks may not overlap one another in whole or in part and may together span (i.e., completely overlap) the entire network.

In some embodiments, the hub and the terminals may be configured to use private IP addresses (e.g., in association with their respective network interfaces) for at least the purpose of supporting IP connectivity to the terminals themselves over the satellite link.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method comprising:
    assigning, to each of a plurality of terminals in a communication system, a first Internet Protocol (IP) address and a first subnet mask, wherein the first subnet mask corresponds to a first subnet of the communication system;
    assigning, to a terminal of the plurality of terminals, a second IP address and a second subnet mask, wherein the second IP address is included in the first subnet, and wherein the second subnet mask corresponds to at least one of the first subnet or a partial subnet of the first subnet;
    providing, at the terminal, one or more proxy Address Resolution Protocol (ARP) replies;
    advertising, from the terminal, a route corresponding to the second IP address, wherein a subnet mask associated with the route corresponds to a single address subnet mask; and
    adding, to a routing table of the terminal, a first routing rule corresponding to the first subnet, a second routing rule corresponding to the second IP address, and two or more routing rules corresponding to two or more subnets of the first subnet that do not overlap one another and together span the first subnet in its entirety.

2. The method of claim 1, wherein the first subnet corresponds to the communication system.

3. The method of claim 1, wherein a subnet mask associated with the second routing rule corresponding to the second IP address corresponds to a single address subnet mask.

4. The method of claim 1, wherein a route corresponding to the first IP address is not advertised.

5. The method of claim 1, wherein the first IP address and the second IP address are public IP addresses.

6. The method of claim 1, wherein the second IP address is assigned to a node connected to the terminal.

7. The method of claim 6, wherein the second IP address is assigned to the node by the terminal using Dynamic Host Configuration Protocol (DHCP).

8. The method of claim 6, wherein the communication system comprises a hub that is connected to a public IP network, the method further comprising exchanging, between the node and the public IP network, packets in accordance with the second IP address.

9. The method of claim 1, wherein IP connectivity to the terminal is in accordance with a third IP address.

10. The method of claim 9, wherein the third IP address is a private IP address.

11. The method of claim 1, wherein the communication system is a wireless communication system.

12. The method of claim 1, wherein the communication system is a satellite communication system.

13. A terminal configured to:
    use an assigned first Internet Protocol (IP) address and a first subnet mask, wherein the assigned first IP address is also assigned to at least one other terminal in a communication system comprising the terminal, and wherein the first subnet mask corresponds to a first subnet of the communication system;
    use an assigned second IP address and a second subnet mask, wherein the assigned second IP address is included in the first subnet, and wherein the second subnet mask corresponds to at least one of the first subnet or a partial subnet of the first subnet;
    provide one or more proxy Address Resolution Protocol (ARP) replies;
    advertise a route corresponding to the assigned second IP address, wherein a subnet mask associated with the route corresponds to a single address subnet mask; and
    add, to a routing table of the terminal, a first routing rule corresponding to the first subnet, a second routing rule corresponding the assigned second IP address, and two or more routing rules corresponding to two or more subnets of the first subnet that do not overlap one another and together span the first subnet in its entirety, wherein a subnet mask associated with the second routing rule corresponding to the assigned second IP address corresponds to a single address subnet mask.

14. The terminal of claim 13, wherein the first subnet corresponds to the communication system.

15. The terminal of claim 13, wherein the terminal is further configured to not advertise a route corresponding to the assigned first IP address.

16. The terminal of claim 13, wherein the terminal is further configured to assign the second IP address to a node connected to the terminal.

17. The terminal of claim 16, wherein the terminal is configured to assign the second IP address to the node using Dynamic Host Configuration Protocol (DHCP).

18. The terminal of claim 16, wherein the terminal is further configured to use a third IP address for IP connectivity of the terminal, and wherein the third IP address is a private IP address.

19. The terminal of claim 13, wherein the communication system is a satellite communication system, and wherein the terminal is a satellite communication terminal.

20. A method comprising:
    assigning, to each of a plurality of terminals in a communication system, a first Internet Protocol (IP) address and a first subnet mask, wherein the first subnet mask corresponds to a first subnet of the communication system;
    assigning, to a terminal of the plurality of terminals, a plurality of IP addresses and a second subnet mask, wherein the plurality of IP addresses are included in the first subnet, and wherein the second subnet mask corresponds to at least one of the first subnet or a partial subnet of the first subnet;
    providing, at the terminal, one or more proxy Address Resolution Protocol (ARP) replies;
    advertising, from the terminal, a plurality of routes corresponding to the plurality of IP addresses, wherein a subnet mask associated with each of the plurality of routes corresponds to a single address subnet mask;

adding, to a routing table of the terminal, a routing rule corresponding to the first subnet, a plurality of routing rules corresponding to the plurality of IP addresses, and two or more routing rules corresponding to two or more subnets of the first subnet that do not overlap one another and together span the first subnet in its entirety; and assigning, from the plurality of IP addresses, IP addresses to a plurality of nodes connected to the terminal.

\* \* \* \* \*